United States Patent Office.

CHARLES J. EAMES, OF NEW YORK, N. Y., ASSIGNOR TO THE CARBON IRON COMPANY, OF SAME PLACE.

PROCESS OF MANUFACTURING WROUGHT AND STEELY IRON DIRECT FROM THE ORE.

SPECIFICATION forming part of Letters Patent No. 318,607, dated May 26, 1885.

Application filed February 27, 1885. (No specimens.)

*To all whom it may concern:*

Be it known that I, CHARLES J. EAMES, a citizen of the United States, residing at New York city, in the State of New York, have invented certain new and useful Improvements in Processes of Manufacturing Wrought and Steely Iron Direct from the Ore; and I hereby declare the following to be a full, clear, and exact description of the same.

My present method of producing wrought-iron, steely iron, and steel direct from the ore contemplates the use as a deoxidizer and carburizer of graphitic carbon; and it further contemplates continuing the process through the several stages of deoxidation and carburization at such temperatures as will avoid either loss of metal or formation of slaggy sponge, whereby the manufacture of wrought and steely irons and steel is reduced to an economic and uniform process.

Heretofore in the manufacture of iron and steel direct from the ore the most commonly-used deoxidizing and carburizing agent has been charcoal, and less frequently plumbago. The most common process has involved the admixture of the carbonaceous matter and flux with the ore and the employment of high temperatures, which resulted in the fusion of the metal.

Where plumbago has been heretofore employed, it has been in solid mass, as in the form of slabs for furnace-linings, or in like condition for crucibles, the objection to which is that until the metal is molten and the scoria cuts out the solid carbon it has little or no effect as a deoxidizer or carburizer, and even then is uncertain and not controllable. In the only other form in which plumbago has been generally employed—viz., in the pulverized state found in commerce—it is drifted by the currents in the furnace, clogs the interstices between the ore at points, so as to cause unequal heats and unequal deoxidation and carburization at different points in the charge. Moreover, a large per cent. of the plumbago is lost in the slag. Added to these objections are the large amount of charcoal or other form of soft carbon required and the high price of plumbago, all of which add materially to the cost of manufacture, where said forms of carbon are used.

In carrying out my invention, to avoid these several objections, the carbon is employed in the form of friable graphitic masses or lumps, either artificially prepared—as, for instance, a compound of, say, sixty (60) per cent. pulverized graphite and forty (40) per cent. pulverized fire-brick, intermingled thoroughly and rendered plastic by a carbonaceous adhesive binder—such as coal or wood tar, molasses, and the like; or in lieu thereof, where convenient, the "graphitic carbon" of commerce—such as is found at Cranston, Rhode Island, and in other localities, being an impure graphite containing earthy matter and iron in considerable quantities, and which can be obtained cheaply—is employed as it comes from the mines, and which, being in small lumps presenting many angles and being friable, will answer fully.

The process in its perfection contemplates the use of, first, a furnace having a sole or hearth of this friable graphitic character upon which the charge rests; secondly, a charge of the ore in its natural condition or as it is mined, and devoid of extraneous or added flux, but having intermingled with it lumps of graphitic carbon; and, thirdly, a covering of lumps of graphitic carbon. The process, however, may be practiced by omitting either the second or the third feature—that is to say, by omitting either the intermingling of graphitic lumps with the charge, or by dispensing with the covering of graphitic lumps—but if the lumps be omitted from the charge the process will be more tedious, as the carbon is not so directly presented to the ore, while if the lump covering is omitted the furnace must be worked more guardedly and the temperatures more carefully controlled. In either case the charge is first subjected to a temperature not exceeding 1,500° Fahrenheit or 2,000° Fahrenheit, or such a temperature as will maintain the interior of the furnace at a dull-red heat. This temperature is maintained until the ore is deoxidized, which will take from five (5) to seven (7) hours, according to the character of the ore. As soon as deoxidation is completed and the iron sponge containing the free metal inclosed in its earthy matrix is obtained the heat may be raised sufficiently to cause the agglutination of the metallic particles, and the mass may be balled and conveyed to the blooming apparatus for the manufacture of wrought-iron; but if steely iron or steel is desired the balling and blooming is postponed until a later stage, and the heat is raised slightly, (say 2,000° Fahrenheit to 2,500° Fahrenheit, or more, if the nature of the ore demand it,) and is maintained thereat from three (3) to six (6) or seven (7) hours, according to the degree of carburization required in the metal, after which the mass is balled and removed to the blooming apparatus.

The advantages of my process are that the results are certain and controllable and uniform, little or none of the carburizing agent is lost, and a practical and economic method of obtaining steely iron direct from the ore is obtained.

I do not herein claim a friable graphitic hearth, as the same forms the subject-matter of cases Serial No. 144,152, filed September 27, 1884, and 149,823, filed December 9, 1884.

In case Serial No. 149,683, filed December 6, 1884, I have described and claimed the production of iron sponge by charging the ore intermingled with graphitic lumps on a friable graphitic hearth, either with or without a covering of lumps of graphitic carbon; and in said case I have also claimed the production of steelified iron by a like process, when the graphitic lumps were mingled with the charge and the charge subjected to a high sustained heat; furthermore, in case Serial No. 149,684, filed December 6, 1884, I have described and claimed the production of iron sponge by charging the ore alone upon a friable graphitic hearth, and covering the charge with a layer of lump-graphite and subjecting the charge to a dull-red sustained heat for a short period, the heat being increased and prolonged for the manufacture of wrought-iron. Therefore I do not herein claim any of such subject-matter, as the characteristics of the present case are, first, that the ore without admixture, on a friable graphitic hearth, and with a covering of lump-graphite, is subjected first to a dull-red and then to a higher sustained heat for the production of a steelified iron passing continuously through the sponge and wrought-iron states; secondly, a like process involving the admixture of lumps of graphitic carbon with the ore, conducting the process until the state of sponge is passed and arresting it at the wrought-iron stage; and

What I claim, and desire to secure by Letters Patent, is—

1. The process herein described, which consists in charging the ore on a friable graphitic hearth, covering the charge of ore with a layer of lump-graphite, subjecting the charge to a dull-red sustained heat until deoxidation is accomplished, and then to a higher sustained heat for a suitable short period to agglomerate the mass so that the sponge can be balled and removed to the blooming apparatus for the production of wrought-iron, as hereinbefore described, or for a suitable longer period for the production of steel or steelified iron, substantially as described.

2. The process herein described, which consists in charging the ore mingled with lumps of graphitic carbon on a friable graphitic hearth, covering the charge with a layer of graphitic lumps, subjecting the charge thus formed, first, to the action of a dull-red sustained heat until deoxidation is accomplished, and then to a higher sustained heat short of the fusing-point of the metal for a suitable short period of time, for the production of wrought-iron, as hereinbefore described, or for a suitable longer period for the production of steelified iron or steel, as described.

In testimony whereof I affix my signature, in presence of two witnesses, this 27th day of February, 1885.

CHARLES J. EAMES.

Witnesses:
F. W. RITTER, Jr.,
G. A. TAUBERSCHMIDT.